United States Patent
Pierce et al.

(10) Patent No.: US 10,682,884 B1
(45) Date of Patent: Jun. 16, 2020

(54) AXLE DIFFERENTIAL GUARD

(71) Applicant: Caterpillar Inc., Deerfield, IL (US)

(72) Inventors: Dan J. Pierce, Deadwood, SD (US);
Jim D. Angell, Naperville, IL (US);
Bradley J. Miller, Geneva, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 16/452,915

(22) Filed: Jun. 26, 2019

(51) Int. Cl.
| | |
|---|---|
| *B60B 35/00* | (2006.01) |
| *B60B 35/16* | (2006.01) |
| *B60B 35/12* | (2006.01) |
| *F16H 57/04* | (2010.01) |
| *E02D 3/026* | (2006.01) |
| *B60B 35/14* | (2006.01) |

(52) U.S. Cl.
CPC .......... B60B 35/166 (2013.01); B60B 35/122 (2013.01); F16H 57/0408 (2013.01); *B60B 35/14* (2013.01); *E02D 3/026* (2013.01)

(58) Field of Classification Search
CPC .............................. F16H 57/02; F16H 57/042
See application file for complete search history.

(56) References Cited

U.S. PATENT DOCUMENTS

| | | | | |
|---|---|---|---|---|
| 3,153,464 | A * | 10/1964 | Nelson | F16H 48/06 |
| | | | | 184/11.2 |
| 5,839,531 | A * | 11/1998 | McGee | F01M 11/0408 |
| | | | | 180/69.1 |
| 6,796,404 | B1 * | 9/2004 | Dick, Jr. | B60T 8/171 |
| | | | | 188/1.11 E |
| 7,055,895 | B1 * | 6/2006 | King | B62D 25/2072 |
| | | | | 280/770 |
| 8,402,878 | B2 | 3/2013 | Schreiner et al. | |
| 8,579,308 | B2 | 11/2013 | Weeks et al. | |
| 8,839,901 | B1 * | 9/2014 | Bradshaw | B62D 25/2072 |
| | | | | 180/346 |
| 2006/0054411 | A1 * | 3/2006 | Fett | F16H 57/0412 |
| | | | | 184/6.22 |
| 2016/0167432 | A1 * | 6/2016 | Szczepanski | B60B 35/16 |
| | | | | 301/137 |
| 2017/0320522 | A1 | 11/2017 | Lorenz et al. | |

* cited by examiner

*Primary Examiner* — James A Shriver, II
*Assistant Examiner* — James J Triggs
(74) *Attorney, Agent, or Firm* — Schwegman, Lundberg & Woessner (57) ABSTRACT

A guard for protecting a drain plug and a ground-facing surface of an axle housing on a machine including a first portion and a second portion. The first portion has a body configured to be mounted to the axle housing to protect at least portion of the ground-facing surface of the axle housing. The body includes an opening configured to allow access to and removal of the drain plug through the opening. The second portion is removably couplable to the first portion. When the second portion is attached to the first portion, the second portion covers the opening to protect the drain plug. When the second portion is removed, the drain plug is accessible and removable to service oil in the axle housing.

20 Claims, 9 Drawing Sheets

AXLE DIFFERENTIAL GUARD

TECHNICAL FIELD

The present disclosure is directed generally, but not by way of limitation, to protecting axles, and, more particularly to protecting axles on landfill compactor machines.

BACKGROUND

Machines used in landfills, earth moving, agricultural and construction applications are subjected to extreme wear. Chassis components on the undercarriage of such machines can be damaged by material such as landfill waste, rubble and other debris that rub against the chassis components. Over time, the repeated abrasion can damage chassis components, including front and rear axle differentials.

Landfill compactors work in a particularly abrasive environment. The lower powertrain and bottom of the chassis drag in the rubble. The lowest point of the undercarriage is the axle housing which houses the axle and differential. Even though an axle housing can be made to be strong and durable, repeated abrasion over time can cause a hole to be formed in the axle housing resulting in a leak or broken housing.

Various undercarriage guards (e.g. shield, protectors) have been devised to protect components, however, the axle housing remains exposed. A drawback of undercarriage guards is that they can make it difficult to access components protected by the guard to perform service (e.g., maintenance) on the component.

One attempt to address the issue of protecting undercarriage components is described in US Patent Publication No. 2017/0320522 to Lorenz et al. and published on Nov. 9, 2017. The '522 publication describes a suspension module having a subframe assembly. The subframe assembly can include a skid plate disposed at the bottom of the subframe. The skid plate can prevent impact damage to components that are received in a suspension module. While the '522 publication provides protection to some chassis components, the '522 publication fails to perform ideally and can prevent easy access to components requiring regular service.

Another attempt to address the issue of protecting undercarriage components is described in U.S. Pat. No. 8,402,878 to Schreiner et al. issued on Mar. 26, 2013. The '878 publication describes a skid plate to protect various components against a blast. While the '878 patent describes a skid plate in an attempt to protect components against a blast, the '878 patent fails to perform ideally in certain environments such as a landfill where the damage to undercarriage components occurs under different circumstances.

The present disclosure is directed to overcoming one or more of the shortcomings set forth above and/or other shortcomings in the art.

SUMMARY

In one aspect, the present disclosure relates to an axle system for a machine. The axle system includes an axle and a differential coupled to the axle to transmit motion from a power source to the axle. The axle and differential are disposed in a housing in an oil-sealed manner. The housing has an inner surface opposite an outer surface, the inner surface defining at least a portion of a cavity, the outer surface including a frame-facing surface and a ground-facing surface. A drain plug is removably couplable to the housing to seal and service oil in the housing.

The axle system also includes a guard (e.g., an axle guard, axle differential guard) mounted to the housing and covering at least a portion of the ground-facing surface of the housing. The guard includes a first portion and a second portion. The first portion is mounted to the housing by a first fastener, and a second portion is removably couplable to the first portion by a second fastener.

The first portion has a body defined by an inner surface opposite an outer surface and an aperture extending through the body from the inner surface to the outer surface. The aperture is located proximate the drain plug and the aperture is sized and shaped to allow access to and removal of the drain plug through the aperture.

The second portion has a second body defined by a drain plug-facing surface opposite a service access surface. When the second portion is mounted to the first portion, the second portion covers the aperture in the first portion. When the second portion is removed from the first portion, the drain plug is accessible and removable to service oil in the housing.

In another aspect, the present disclosure relates to a guard for protecting a drain plug and a ground-facing surface of an axle housing on a machine. The guard includes a first portion and a second portion. The first portion having a body configured to be mounted to the axle housing to protect at least portion of the ground-facing surface of the axle housing. The body includes an aperture configured to allow access to and removal of the drain plug through the aperture.

The second portion is removably couplable to the first portion. When the second portion is attached to the first portion, the second portion covers the aperture to protect the drain plug. When the second portion is removed from the first portion, the drain plug is accessible and removable to service oil in the axle housing.

In yet another aspect, the present disclosure relates to a guard for protecting an axle housing and a drain plug of a machine. The guard includes a first portion and a second portion. The first portion includes a first fastener to couple the first portion to the axle housing. The first portion has a body defined by an inner surface opposite an outer surface and an aperture extending through the body from the inner surface to the outer surface. The aperture is arranged to be located proximate the drain plug and the aperture is sized and shaped to allow access to, and removal of, the drain plug through the aperture.

The second portion includes a second fastener to couple the second portion to the first portion. The second portion has a second body defined by a drain plug-facing surface opposite a service access surface. When the second portion is mounted to the first portion, the second portion covers the aperture. When the second portion is removed from the first portion, the drain plug is accessible and removable to service oil in the axle housing through the aperture.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

Examples of guards for protecting axles and differentials disposed in an axle housing are described herein. Examples described in this disclosure prevent damage to an axle and differential of a landfill compactor. In addition to preventing damage, the examples described herein maintain the ability to service the oil in the axle without entirely removing the guard (e.g., axle guard, axle differential guard).

The guards described herein minimize failures by preventing material and debris from coming into direct contact with the bottom of the axle housing. The guards include a removable (e.g., de-couplable) portion to access the drain plug for servicing the oil in the axle.

Reference will now be made in detail to embodiments of the disclosure, examples of which are illustrated in the accompanying drawings. The same reference numerals generally refer to the same or like components throughout the drawings. Relative terms, such as, "substantially" or "about" are used to indicate a possible variation, for example, of 10% in a stated numeric value, or to reflect a manufacturing tolerance. As defined herein, the use of the terms "or" or "and" includes "or", "and" or "and/or".

Figure 1:
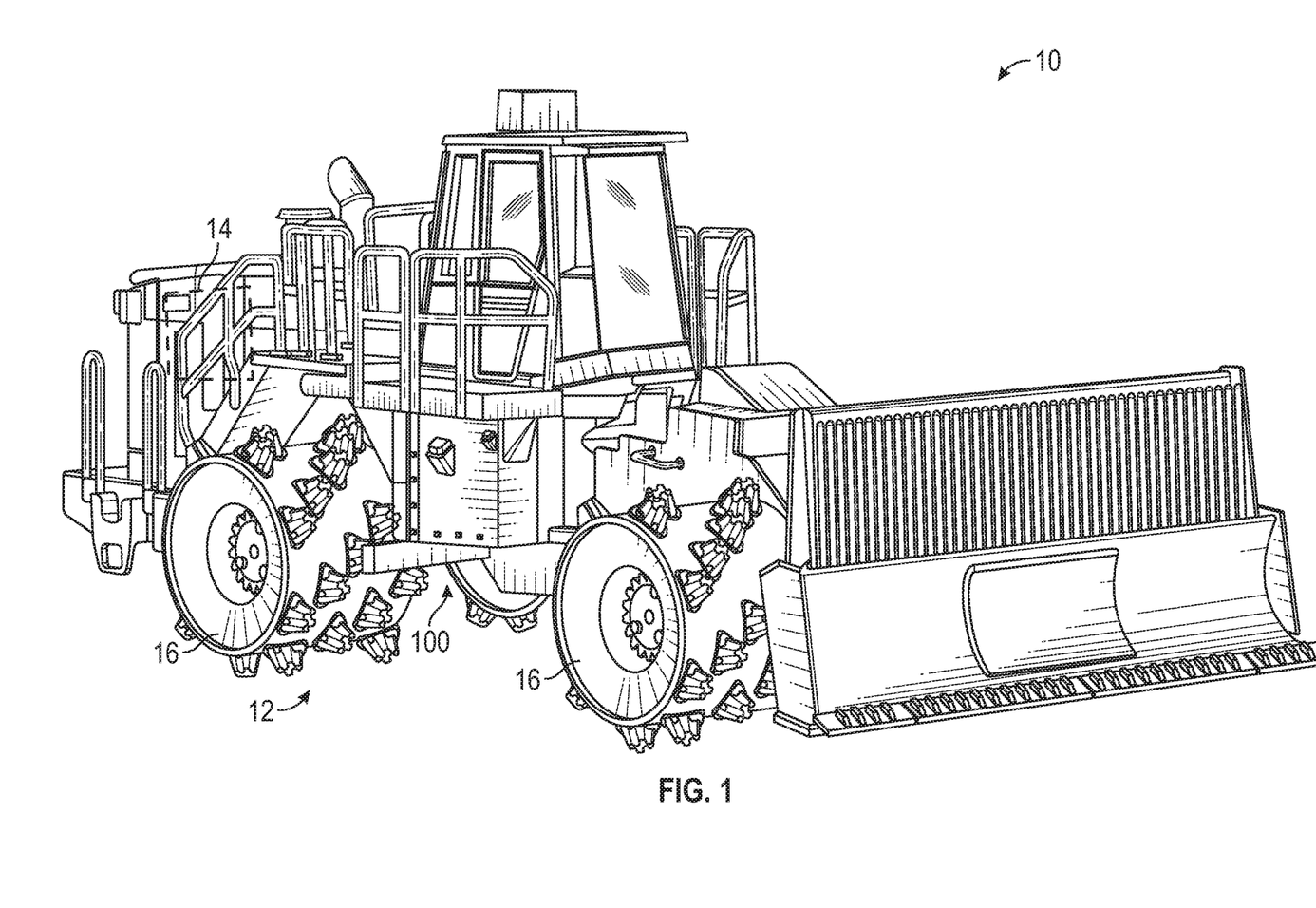
FIG. 1 is a perspective view of a landfill compactor machine which can include an axle system having a guard, in accordance with at least one example.

FIG. 1 illustrates a perspective view of a machine 10. Machine 10 can include an axle system 100, such a front axle system or a rear axle system. In the present example, the front and rear axle systems are similar or identical for the purposes of this disclosure, but in some examples, the front and rear axle systems could be different.

As shown in FIG. 1, machine 10 includes drive system 12 that transfers motion from a prime mover 14 to wheels 16, tracks or other the like. To cause the drive system 12 to move the machine 10 relative to a ground, the prime mover 14 generates rotational motion and transfers the rotational motion to the wheels 16 via intermediate components, including an axle system 100 that causes the wheels 16 to rotate. The prime mover 14 can be any suitable type of power source known in the art, including, but not limited to a diesel-powered, gas-powered, or natural gas-powered engine, an electric powered motor, or hybrid power system.

In various examples, the machine 10 can be any suitable machine 10, such as a landfill compactor, a general-purpose machine, a tractor, a wheel loader, a backhoe, an excavator, a material handler and the like. While the machine 10 is illustrated in the context of a landfill compactor machine, it should be appreciated that the present disclosure is not thereby limited, and that a wide variety of other machines can include features of the example guards described herein.

Any use of the terms front and rear, forward and backward, are used in reference to an example axle system for a rear axle. However, the examples described herein can be used with a front axle system that is identical, or a mirror image of the rear axle system described herein. In some examples, the front axle system can also be different than the rear axle system. The description and the accompanying claims apply to these examples, regardless of the use of the terms front and rear, forward and rearward used to describe the examples.

Figure 2:
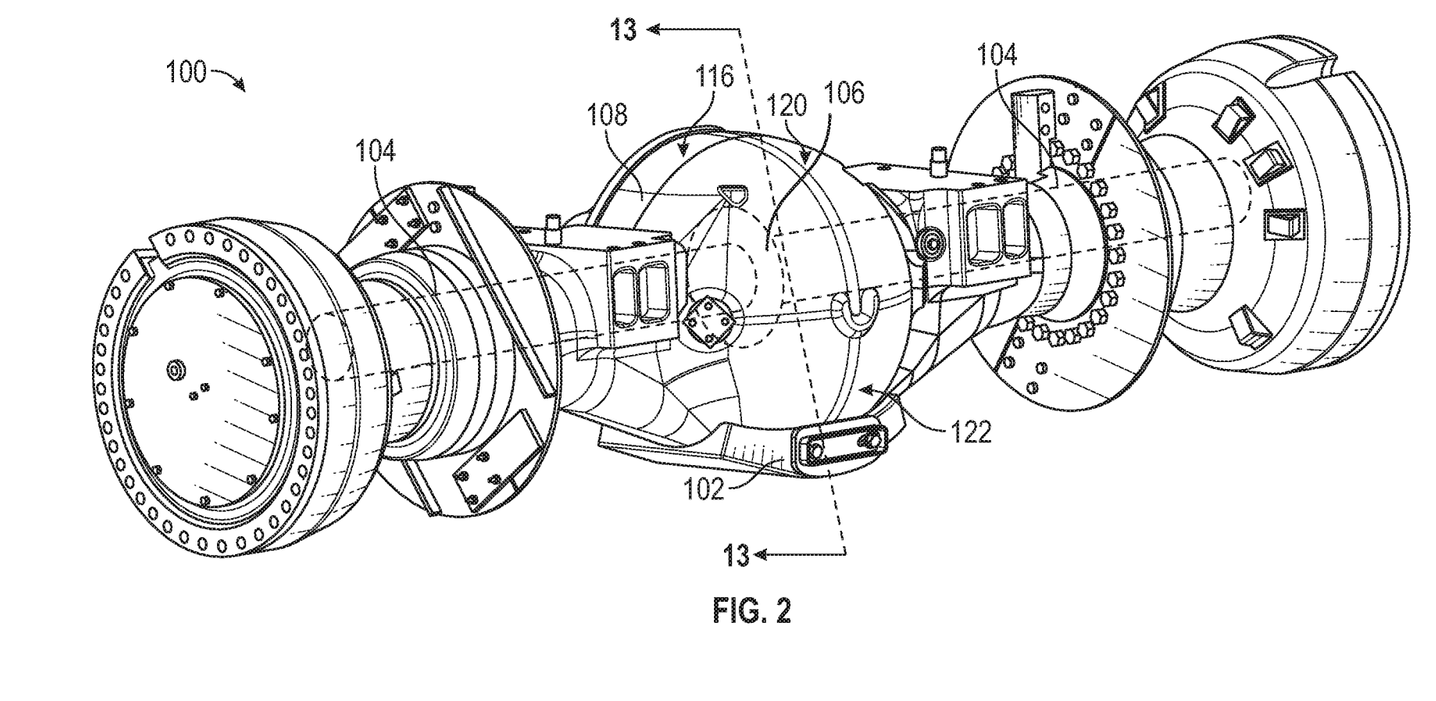
FIG. 2 is a rear perspective view of a rear axle system including a guard suitable for use with the machine of FIG. 1, in accordance with at least one example.

FIG. 2 illustrates a rear perspective view of an example axle system 100 (e.g., a rear axle) including a guard 102 suitable for use with the machine 10 of FIG. 1. The guard 102 can also be referred to as an axle guard or an axle differential guard. The axle system 100 is protected against wear by the guard 102, which is shown and described in FIGS. 2-13, in accordance with at least one example.

The axle system 100 includes an axle 104, a differential 106, axle housing 108 (hereinafter, housing), a drain plug 110 (FIG. 4) and the guard 102 (hereinafter, guard). The axle 104 can include one or more axle components, such as two half shafts or another type of axle assembly, as is known in the art. The differential 106 can be coupled to the axle 104 to transmit motion from a power source, such as the prime mover 14, to the axle 104. The axle 104 and the differential 106 are disposed in a cavity 114 (FIG. 13) of the housing 108 in an oil sealed manner. The cavity 114 can be at least a portion of a cavity.

Figure 4:
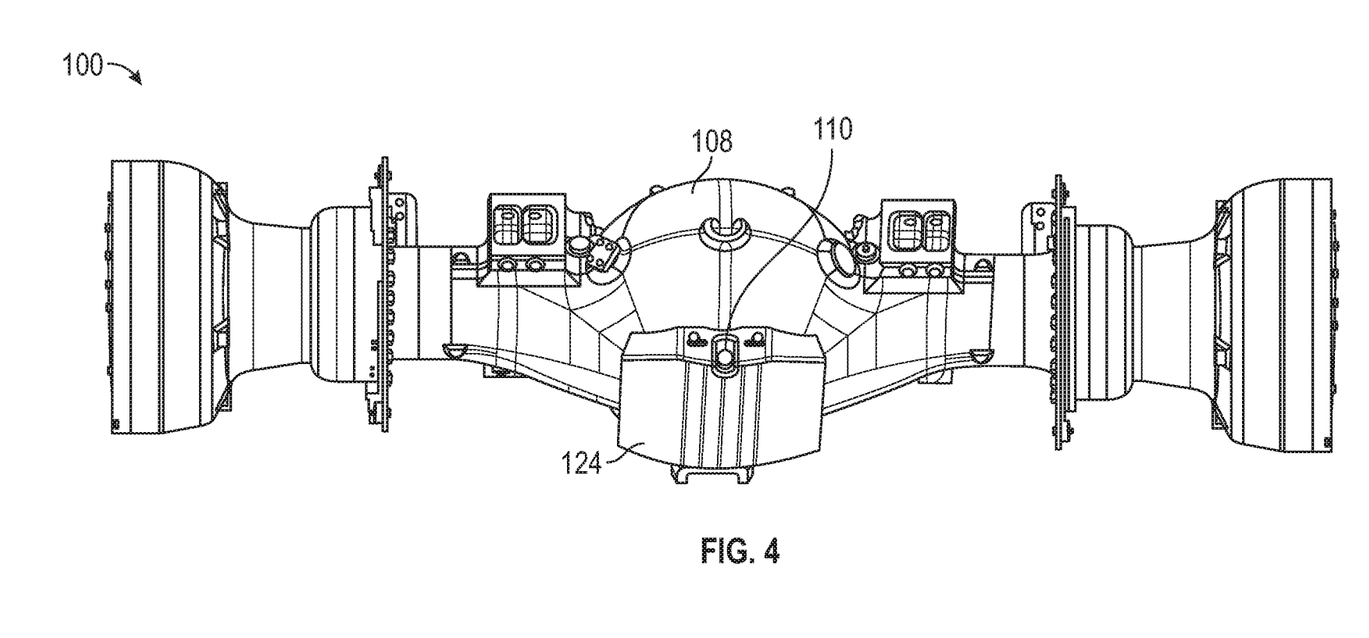
FIG. 4 is a bottom-rear view of the axle system of FIG. 2 with a portion of the guard removed, in accordance with at least one example.
Figure 13:
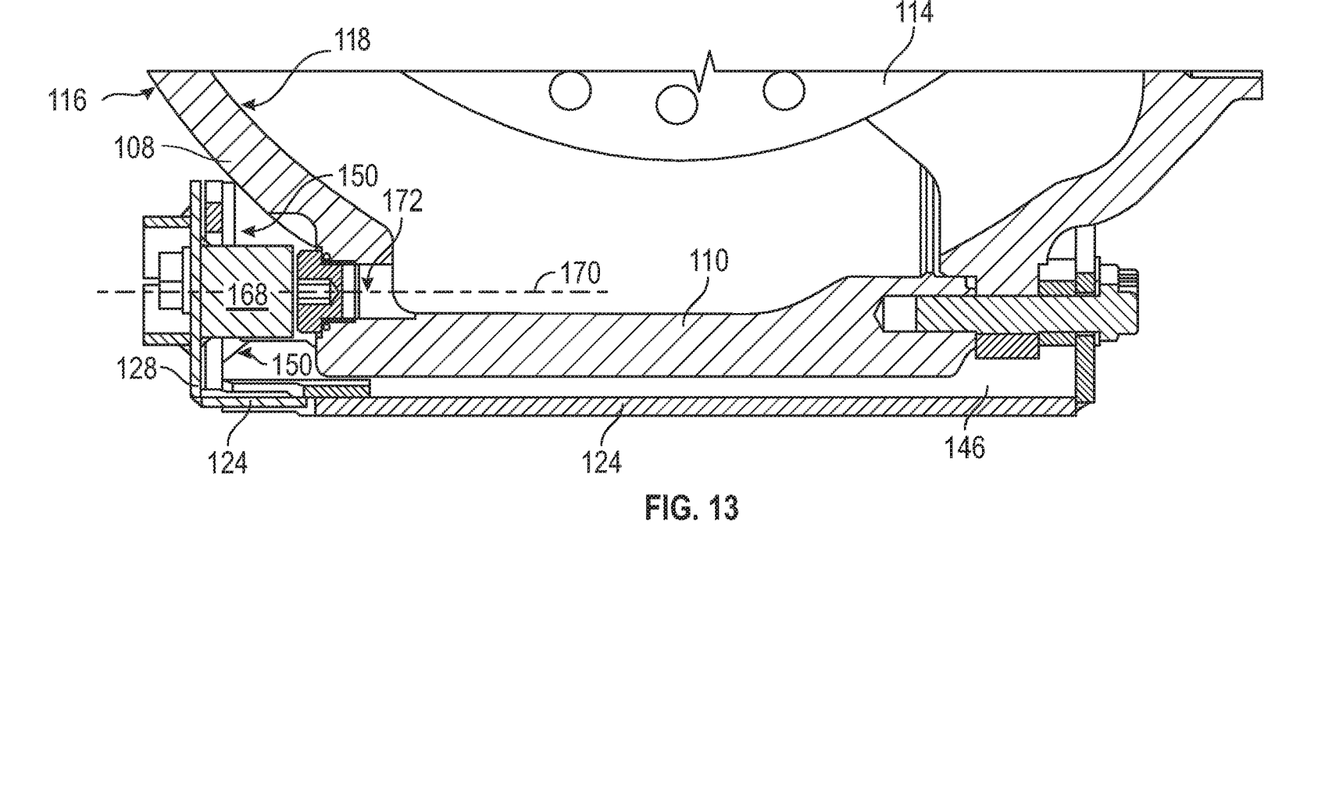
FIG. 13 is a general schematic depicting a partial cross section of a housing of the axle system of FIG. 2, taken along line 13-13' in FIG. 2, in accordance with at least one example.

As shown in FIG. 2, the housing 108 includes an outer surface 116. As shown in FIG. 13, the housing 108 also includes an inner surface 118 opposite the outer surface 116. The inner surface 118 defines the cavity 114 (FIG. 13) for housing the axle 104 and differential 106 (FIG. 2). As shown in FIG. 2, the outer surface 116 can include a frame-facing surface 120 and a ground-facing surface 122. To protect the housing 108 from damage, the guard 102 can be mounted to the housing 108 to cover at least a portion of the ground-facing surface 122 of the housing 108 as well as the drain plug 110 (FIG. 4). The drain plug 110 is removable to service oil within the housing 108. The guard 102 can be shaped to interface with the outer surface 116 of the housing 108 in a complementary manner to prevent debris from passing between the guard 102 and the housing 108.

Figure 3:
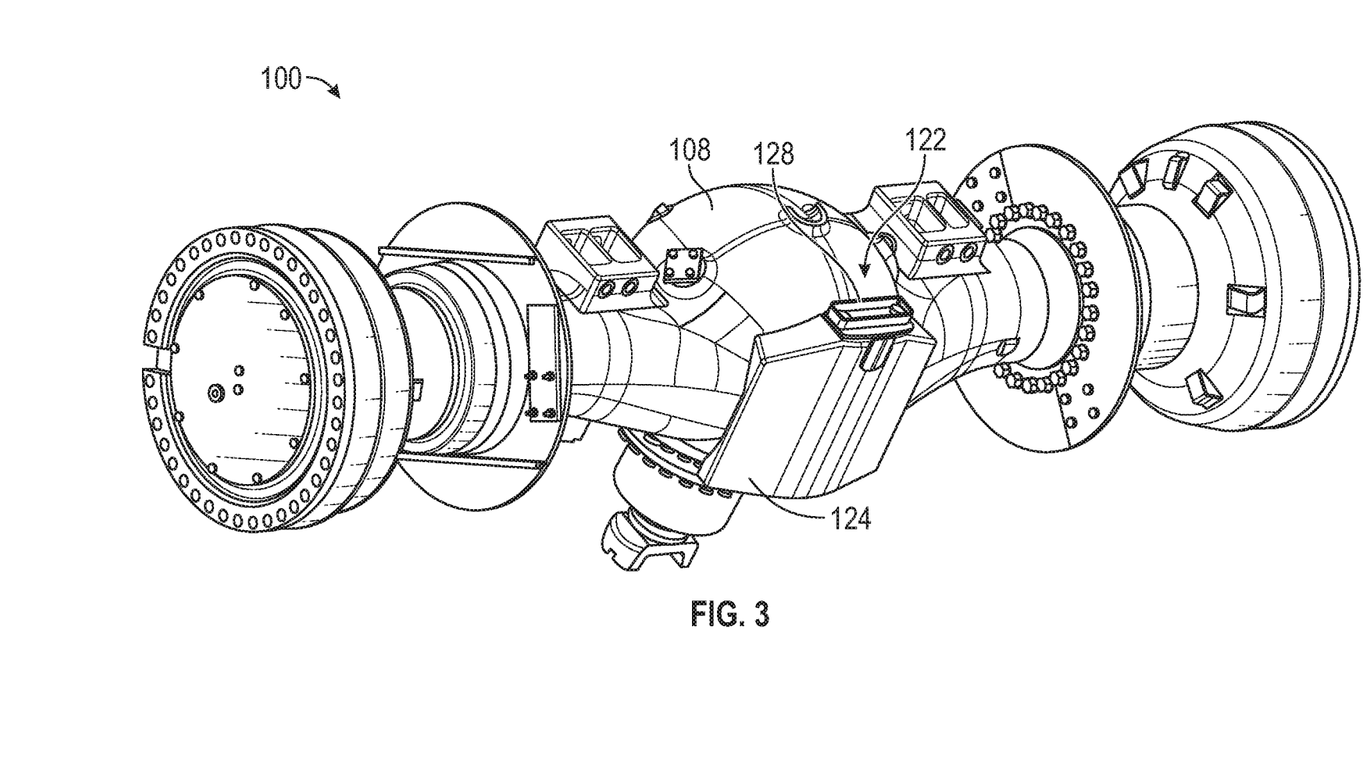
FIG. 3 is a bottom perspective view of the axle system of FIG. 2, in accordance with at least one example.

FIG. 3 illustrates a bottom perspective view of the axle system 100 of FIG. 2 including the guard 102. At the angle shown in FIG. 3, the guard 102 is more visible. While the guard 102 provides protection to the ground-facing surface 122 of the housing 108 and the drain plug 110 (FIG. 4), the guard 102 undesirably covers the drain plug 110 and interferes with the ability to access the drain plug 110 to service oil in the axle system 100.

To enable servicing the oil without removing the entire guard 102, the guard 102 can include a first portion 124 and a removable second portion 128. FIG. 4 illustrates a bottom-rear view of the axle system 100 of FIG. 2 with the second portion 128 of the guard 102 removed from the first portion 124. With the second portion 128 of the guard 102 removed, the drain plug 110 is accessible, and the oil in the housing 108 can be serviced (e.g., drained and replaced).

FIGS. 5-8 illustrates the guard 102 of FIG. 2 from various views including a rear perspective, front perspective, top and bottom views, respectively. As shown in FIGS. 5-8, the first portion 124 can be configured to be mounted to the housing 108 by a first fastener 126, and the second portion 128 can be coupled to the first portion 124 by a second fastener 130. The first fastener 126 can be received by the housing 108 for mounting the guard 102 to the housing 108. In some examples, and as shown, the first fastener 126 can include a plurality of first fasteners 126 and the second fastener 130 can include a plurality of second fasteners 130. To access the drain plug 110, the second portion 128 can be removable (de-couplable) from the first portion 124 by the removal of second fasteners 130.

The first portion 124 can have a body 132 configured to be mounted to the housing 108 to protect at least a portion of the ground-facing surface 122 of the housing 108 (FIGS. 2-4). The body 132 can be defined by a body inner surface 134 opposite a body outer surface 136. In some examples and as shown in FIGS. 5-8, the first portion 124 can include a base 138 and a flange 140 around the base 138. In some examples the flange 140 can extend around a perimeter 142 (FIG. 8) of the base 138. In some examples the flange 140 can surround most or all of a perimeter 142 of the base 138. The flange 140 can extend away from the base 138 towards the housing 108 and can terminate at a distal end portion 144. The distal end portion 144 of the flange 140 can conform to the shape of the housing 108. The distal end portion 144 can be shaped to interface with the housing 108 in a complementary manner to prevent debris from getting in between the housing 108 and the guard 102 (FIGS. 2-4). In other words, debris is prevented from entering into an enclosure 146 formed by the guard and the housing (FIG. 13).

In some examples, the flange 140 may not necessarily extend away from the base 130 at the furthest edge of the perimeter 142, but are within a perimeter region, such as within ±20% of the perimeter 142, or possibly more preferably, within ±10% of the perimeter 142.

Figure 5:
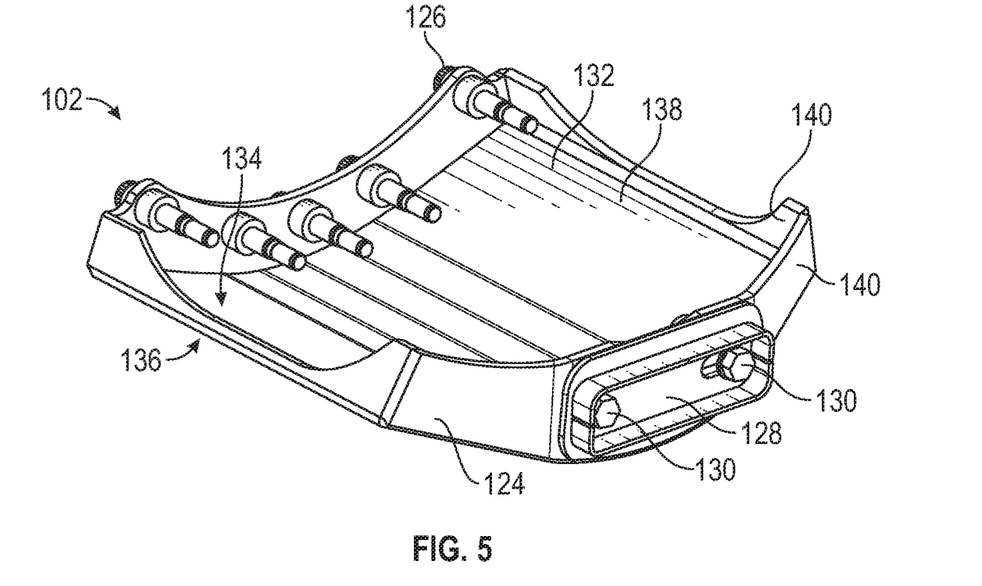
FIG. 5 is a rear perspective view of the guard of FIG. 2, in accordance with at least one example.
Figure 6:
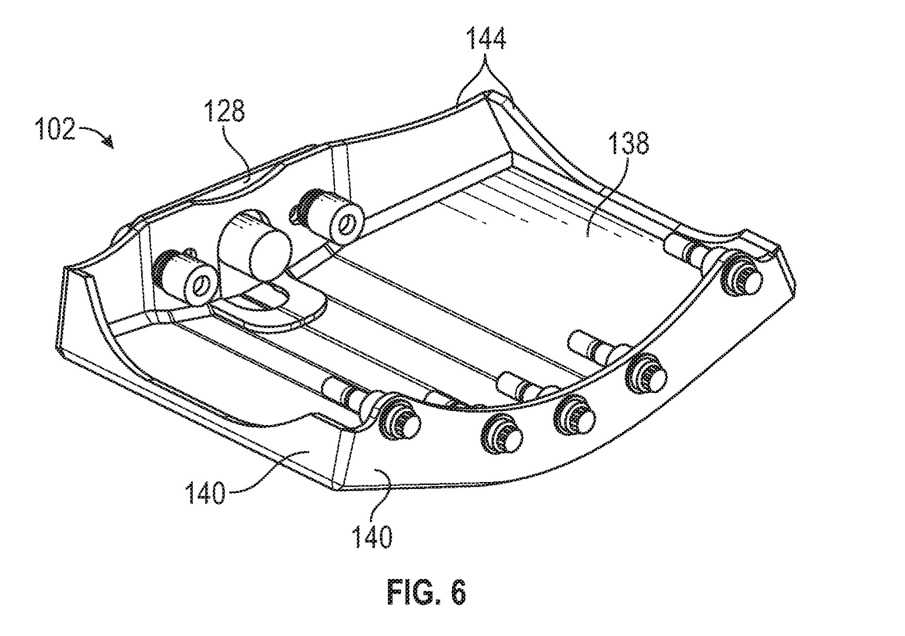
FIG. 6 is a front perspective view of the guard of FIG. 2, in accordance with at least one example.
Figure 7:
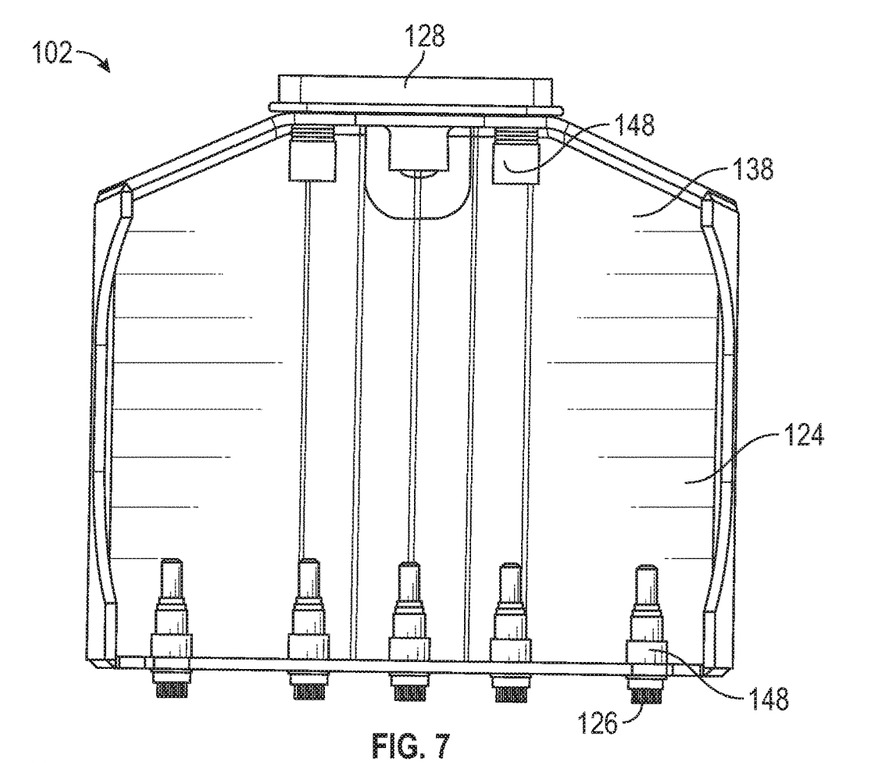
FIG. 7 is top view of the guard of FIG. 2, in accordance with at least one example.
Figure 8:
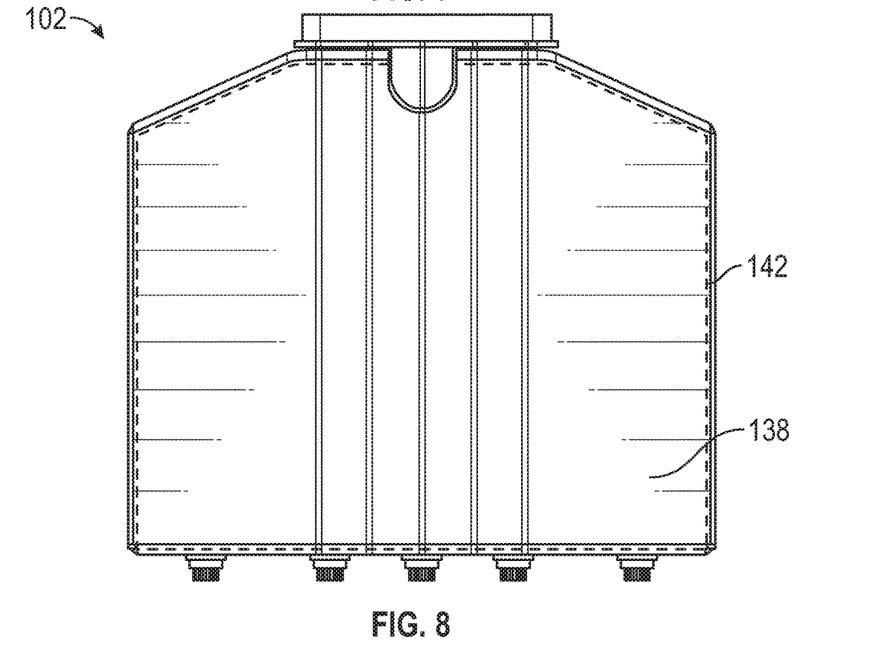
FIG. 8 is a is a bottom view of the guard of FIG. 2, in accordance with at least one example.

As shown in FIGS. 6 and 7, in order to couple the second portion 128 to the first portion 124, the first portion 124 can include one or more attachment members 148, such as bosses, for receiving the first fastener(s) 126 or the second fastener(s) 130 (FIG. 5).

Figure 9:
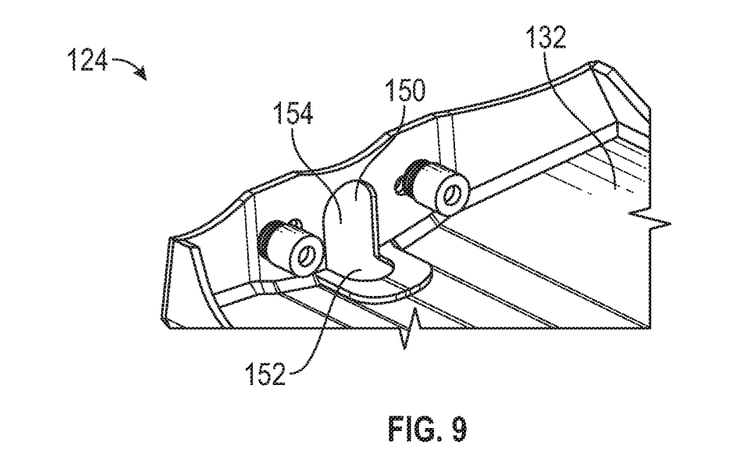
FIG. 9 is a close-up front perspective view of a portion of a first portion of the guard of FIG. 2, in accordance with at least one example.
Figure 10:
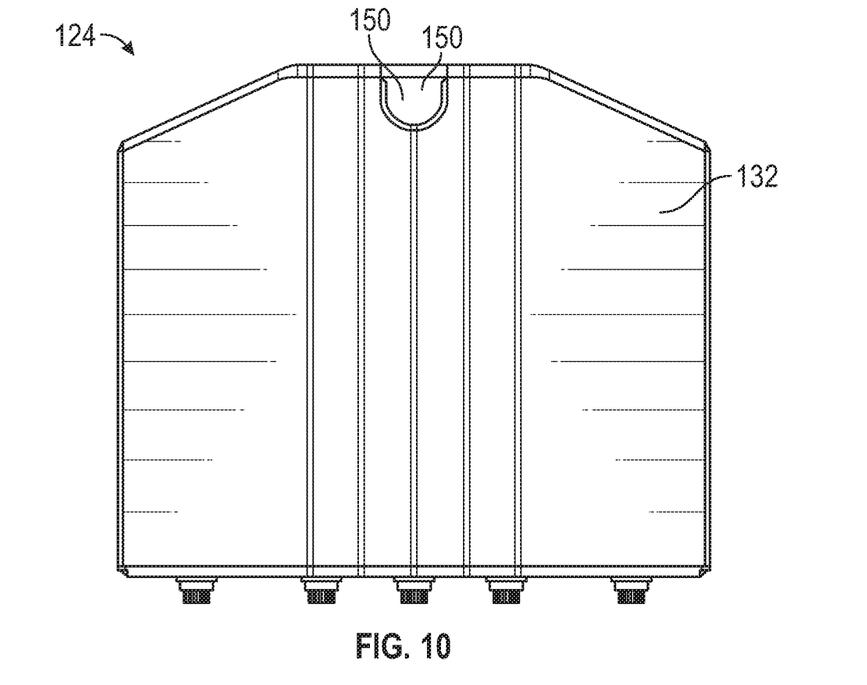
FIG. 10 is a bottom view of the first portion of the guard of FIG. 2, in accordance with at least one example.

FIG. 9 illustrates a close-up front perspective view of a portion of a first portion 124 of the guard 102 of FIG. 2. FIG. 10 illustrates a bottom view of the first portion 124 of the guard 102 of FIG. 2. In both FIGS. 9 and 10, only the first portion 124 of the guard 102 is shown (e.g., the second portion is removed). The body 132 of the first portion 124 can include an opening 150 configured to allow access to and removal of the drain plug 110 through the opening 150 (e.g., an aperture, a cut out). The opening 150 can be arranged to be located proximate the drain plug 110. The opening 150 can be sized and shaped to allow access to and removal of the drain plug 110 through the opening 150 when the second portion 128 (FIGS. 11 and 12) is removed. The opening 150 can also be sized, located and shaped to allow substantially all the oil to drain through the opening 150 while servicing the oil in the housing 108. In some examples, the opening 150 is sized, located and shaped to allow all (e.g., substantially all) the oil to drain through the opening 150 during a standard course of servicing the oil in the housing 108, with no special measures or added steps other than removing the second portion 128.

The opening 150 can include a base opening 152 formed in the base 138, and a flange opening 154 formed in the flange 140. As shown in FIG. 9, the base opening 152 and the flange opening 154 can form one single opening 150. In some example, the base opening 152 and the flange opening 154 can be formed as two separate openings in the first portion 124.

Figure 11:
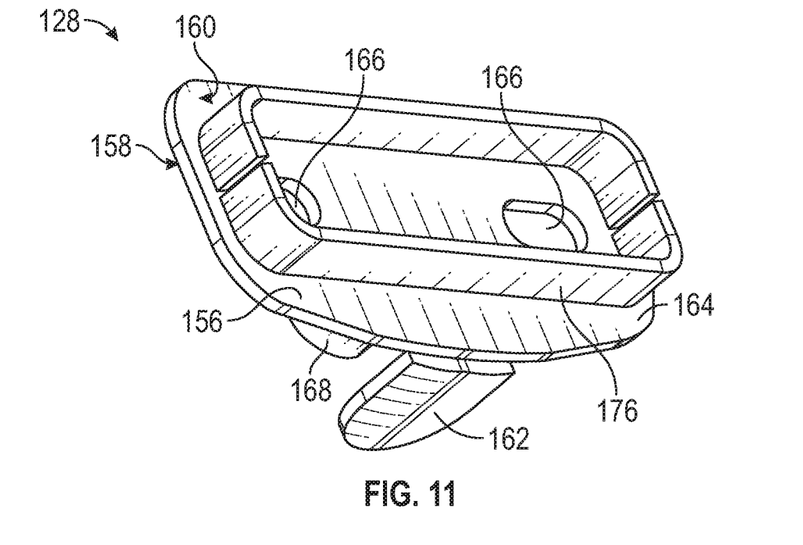
FIG. 11 is a rear perspective view of a second portion of the guard of FIG. 2, in accordance with at least one example.
Figure 12:
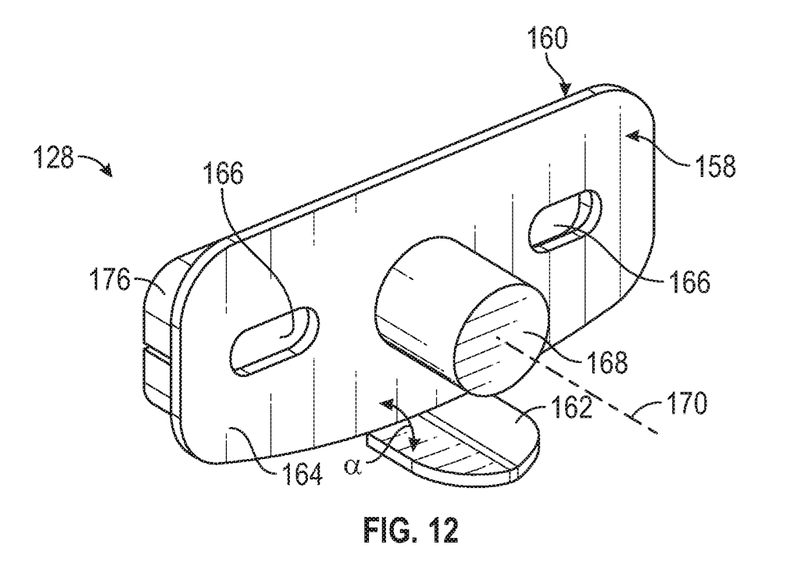
FIG. 12 is a front perspective view of the second portion of the guard of FIG. 2 in accordance with at least one example.

FIGS. 11 and 12 illustrate rear and front perspective views of the second portion 128 of the guard 102 of FIG. 2. The second portion 128 can have a second body 156 defined by a drain plug-facing surface 158 opposite a service access surface 160. The second portion 128 can be removably couplable to the first portion 124. When the second portion 128 is coupled to the first portion 124, the second portion 128 covers the opening 150 to protect the drain plug 110 (FIGS. 3, 6, 7 and 8). When the second portion 128 is removed, the drain plug 110 is accessible and removable, through the opening 150, in order to service the oil in the axle system 100 (FIG. 4). In addition to the drain plug 110 being removable through the opening 150, the oil can also be drained through the opening 150.

The second body 156 of the second portion 128 can cover the opening 150 in the first portion 124. The second body 156 can include a base cover 162 to cover the base opening 152, and a flange cover 164 to cover the flange opening 154. The second portion 128 can completely cover the opening 150 as shown in FIG. 6. However, in some examples, the second portion 128 can partially cover the opening 150. In some examples the second portion 128 can be formed of a single or from multiple components.

As shown in FIGS. 11 and 12, in some examples, the flange cover 164 can include a generally planar form having attachment feature(s) 166, such as holes, to accept the second fastener(s) 130 for coupling the second portion 128 to the first portion 124 (FIG. 5). The flange cover 164 can include an upstanding flange 176 surrounding the attachment features 166 to protect the second fasteners 130 (FIG. 5) from being worn away by debris that the machine 10 is traveling over.

The base cover 162 can extend away (e.g. forward) from the flange cover 164 at an angle α. In some examples, the angle α can be 90 degrees or more, depending on the shape of the first portion 124 (FIGS. 5-11). The angle α can be about 90 degrees, such as in a range between about 75 to 105 degrees. In a possibly preferred example, the angle α can be in a range between about 90 and 160 degrees. In a possibly more preferred example, the angle α can be in a range between about 90 and 135 degrees. The base cover 162 can be provided in the form of a tab as shown in FIGS. 9 and 10.

The second portion 128 can include a protuberance 168 on the drain plug-facing surface 158. The protuberance 168 can extend towards the drain plug 110 on the housing 108. The drain plug 110 and the protuberance 168 can extend generally along a drain plug axis 170 (also see FIG. 13) and the protuberance 168 can be configured to terminate proximate the drain plug 110. The protuberance 168 can interface with the drain plug 110 to limit deflection of the second portion 128 towards the drain plug 110 along the drain plug axis 170. For example, as the second portion 128 comes into contact with debris, the second portion 128 can be caused to flex inward toward the drain plug 110 under a force created by debris the machine 10 (FIG. 1) is passing over. The protuberance 168 can limit deflection of the second portion 128 to a predetermined or specified amount of deflection. Such as limiting deflection to less than 5 mm. In a possibly preferred example, the protuberance 168 can limit deflection to less than 3 mm. In addition to preventing deflection of the second portion 128, the protuberance 168 can also serve to limit movement of the drain plug 110 along the drain plug axis 170 towards the second portion 128, providing a positive stop for the drain plug 110 that prevents movement.

FIG. 13 illustrates a general schematic depicting a partial cross section of a housing 108, guard 102 and drain plug 110 of the axle system 100 of FIG. 2, taken along line 13-13'. As shown in FIG. 13, a gap 172 between the protuberance 168 and the drain plug 110 can be small. In some examples the gap 172 is in a range between 0-5 mm. In a possibly preferred example, the gap 172 can be about 2 mm or in a range between 1-3 mm. In some examples there can be no gap 172, but rather, the protuberance 168 and the drain plug 110 lay line-to-line.

When the second portion 128 is removed, oil is allowed to flow out of the drain plug aperture 174, through at least the base opening 152, and depending on the flow rate and pressure, also through the flange opening 154. When the oil has been drained, the drain plug 110 can be replaced, the oil can be refilled and the second portion 128 re-coupled to the first portion 124 to protect the drain plug 110 during use.

INDUSTRIAL APPLICABILITY

In general, the foregoing disclosure finds utility in various industrial applications, such as in an axle system 100 of a machine 10 such as a landfill compactor, as is shown and described with reference to FIGS. 1-13. The axle system 100 can be used to provide rotation to wheels 16 to traverse the machine 10 across landfill debris.

Some benefits of the axle system 100, including the guard 102 described herein include an improvement in durability of the axle system 100, and the ability to service the oil in the axle system 100 without entirely removing the guard 102. To service the oil in the axle system 100, a first portion 124 of the guard 102 remains coupled to the axle system 100, while a second portion 128 of the guard 102 that covers the drain plug 110 is removed. An opening 150 in the first portion 124 of the guard 102, such as an opening 150 including a base opening 152 and a flange opening 154, allows access to the drain plug 110 and allows oil to pass through the first portion 124 during draining.

It will be apparent to those skilled in the art that various modifications and variations can be made. Other embodiments will be apparent to those skilled in the art from consideration of the specification and the practice of the disclosed machine. It is intended that the specification and examples be considered as exemplary only, with a true scope being indicated by the claims and their equivalents.

What is claimed is:

1. An axle system for a machine, the axle system comprising:
    an axle;
    a differential coupled to the axle to transmit motion from a power source to the axle;
    a housing having an inner surface opposite an outer surface, the inner surface defining at least a portion of a cavity, the outer surface including a frame-facing surface and a ground-facing surface, wherein the axle and differential are disposed in the cavity in an oil sealed manner;
    a drain plug removably couplable to the housing to service oil in the housing; and
    a guard mounted to the housing and covering at least a portion of the ground-facing surface of the housing, the guard comprising:
        a first portion mounted to the housing by a first fastener; and
        a second portion removably couplable to the first portion by a second fastener,
    wherein the first portion has a body defined by an inner surface opposite an outer surface and an opening extending through the body from the inner surface to the outer surface, wherein the opening is located proximate the drain plug and the opening is sized and shaped to allow access to and removal of the drain plug through the opening,
    wherein the second portion has a second body defined by a drain plug-facing surface opposite a service access surface, wherein when the second portion is coupled to the first portion, the second portion covers the opening, and wherein when the second portion is removed, the drain plug is accessible and removable to service oil in the housing.

2. The axle system of claim 1, wherein the guard and the housing form an enclosure between the guard and the housing, wherein the first portion includes a base and a flange around the base, the flange extending away from the base and terminating at a distal end portion, wherein the distal end portion of the flange is shaped to interface with the housing in a complementary manner to prevent debris from entering into the enclosure between the distal end portion of the flange and the housing.

3. The axle system of claim 1, wherein the opening includes a base portion and a flange portion, and wherein the second portion includes a tab to cover the base portion of the opening.

4. The axle system of claim 1, wherein the opening is sized, located and shaped to allow substantially all the oil to drain through the opening during a standard course of servicing the oil in the housing.

5. The axle system of claim 1, wherein the second portion completely covers the opening.

6. The axle system of claim 1, wherein the guard and the housing form an enclosure, wherein the drain plug-facing surface includes a protuberance extending into the enclosure towards the drain plug.

7. The axle system of claim 6, wherein the drain plug extends along a drain plug axis, and wherein the protuberance interfaces with the drain plug to limit deflection of the second portion towards the drain plug along the drain plug axis to a specified amount of deflection, and to limit movement of the drain plug along the drain plug axis towards the second portion.

8. A guard for protecting a drain plug and a ground-facing surface of an axle housing on a machine, the guard comprising:
    a first portion having a body configured to be mounted to the axle housing to protect at least a portion of the ground-facing surface of the axle housing, the body including an opening configured to allow access to and removal of the drain plug through the opening; and
    a second portion removably couplable to the first portion, wherein when the second portion is attached to the first portion, the second portion covers the opening to protect the drain plug, and wherein when the second portion is removed, the drain plug is accessible and removable to service oil in the axle housing.

9. The guard of claim 8, wherein the first portion is shaped to interface with the axle housing in a complementary manner to prevent debris from passing between the first portion and the axle housing.

10. The guard of claim 8, wherein the opening is located in the first portion such that the opening includes a base portion and a flange portion, and wherein the second portion is configured to cover the base portion of the opening and the flange portion of the opening.

11. The guard of claim 8, wherein the opening is configured to allow substantially all the oil to drain through the opening during a standard course of servicing the oil in the axle housing.

12. The guard of claim 8, wherein the second portion is configured to completely cover the opening.

13. The guard of claim 8, wherein the second portion includes a protuberance configured to extend towards the drain plug.

14. The guard of claim 8, wherein the second portion includes a protuberance configured to limit deflection of the second portion towards the drain plug along a drain plug axis to a specified amount of deflection, and to limit movement of the drain plug along the drain plug axis towards the second portion.

15. A guard for protecting an axle housing and a drain plug of a machine, the guard comprising:
   a first portion including a first fastener to couple the first portion to the axle housing, the first portion having a body defined by an inner surface opposite an outer surface and an opening extending through the body from the inner surface to the outer surface, wherein the opening is arranged to be located proximate the drain plug, and wherein the opening is sized and shaped to allow access to, and removal of, the drain plug through the opening; and
   a second portion including a second fastener to couple the second portion to the first portion, the second portion having a second body defined by a drain plug-facing surface opposite a service access surface, wherein when the second portion is coupled to the first portion, the second portion covers the opening, and wherein when the second portion is removed from the first portion, the drain plug is accessible and removable to service oil in the axle housing through the opening.

16. The guard of claim 15, wherein the body includes a base and a flange around the base extending away from the base and terminating at a distal end portion, wherein the distal end portion of the flange is shaped to interface with the axle housing in a complementary manner.

17. The guard of claim 15, wherein the opening includes a base portion and a flange portion, and wherein the second portion includes a tab to cover the base portion of the opening.

18. The guard of claim 15, wherein the opening is sized, located and shaped to allow substantially all the oil to drain through the opening.

19. The guard of claim 15, wherein the drain plug-facing surface includes a protuberance arranged to extend towards the drain plug.

20. The guard of claim 19, wherein the drain plug extends along a drain plug axis, and wherein the protuberance interfaces with the drain plug to limit deflection of the second portion towards the drain plug along the drain plug axis to a specified amount of deflection, and to limit movement of the drain plug along the drain plug axis towards the second portion.

* * * * *